United States Patent [19]

Waldekrantz

[11] 4,425,727

[45] Jan. 17, 1984

[54] INFORMATION BOARD

[76] Inventor: Bo Waldekrantz, S-150 55 Nykvarn, Sweden

[21] Appl. No.: 336,049

[22] Filed: Dec. 31, 1981

Related U.S. Application Data

[63] Continuation of Ser. No. 108,513, Dec. 31, 1979, abandoned.

[30] Foreign Application Priority Data

Feb. 5, 1979 [SE] Sweden .................................. 7900977

[51] Int. Cl.³ .......................... G09F 7/04; B42F 17/08
[52] U.S. Cl. ............................... 40/600; 211/DIG. 1;
40/374; 40/373; 40/375; 40/376; 40/585;
40/611
[58] Field of Search ................. 40/374, 585, 600, 621,
40/373, 375, 376, 380, 384, 621, 17, 611;
211/DIG. 1

[56] References Cited

U.S. PATENT DOCUMENTS

| 775,044 | 11/1904 | Mooser et al. | 40/374 |
| 824,483 | 6/1906 | Johnson | 40/585 |
| 1,447,889 | 3/1923 | Reuschlön | 40/374 |
| 1,970,822 | 8/1934 | Sommers | 40/585 |
| 3,168,787 | 2/1965 | Surrey | 40/600 |
| 3,288,543 | 11/1966 | Sugerman | 40/375 |
| 3,995,387 | 12/1976 | Lotts | 40/374 |

FOREIGN PATENT DOCUMENTS

| 1239369 | 7/1960 | France | 40/611 |
| 822559 | 10/1959 | United Kingdom | 40/611 |
| 954845 | 4/1964 | United Kingdom | 40/611 |
| 1347046 | 2/1974 | United Kingdom | 40/611 |

Primary Examiner—Gene Mancene
Assistant Examiner—John G. Weiss
Attorney, Agent, or Firm—Lerner, David, Littenberg, Krumholz & Mentlik

[57] ABSTRACT

The invention relates to an information board comprising a rectangular base plate having vertical first and second lateral supports; a number of flat, rectangular first and second sign elements arranged in a plane parallel to the base plate, each of said sign elements being provided with at least one groove extending in the plane of the sign element to retain an exchangeable strip provided with characters, of the same length as the sign element and slightly narrower than the groove, said strip being arranged to be inserted in the groove from any of the opposite ends of the sign element; a vertical partition slat arranged to divide the information board into a left panel for a predetermined number of said first sign elements of predetermined length and a right panel for a corresponding number of said second sign elements of predetermined length, said first sign elements being arranged to be received with one end in a groove facing the center of the base plate and formed by said first vertical lateral support, the other end of said first sign elements being placed close to the partition slat, said second sign elements being arranged to be received with one end in a corresponding groove facing the center of the base plate and formed by said second lateral support the other end of said second sign elements being placed close to the partition slat, and each at said first and second sign elements being arranged to be retained in a horizontal position in said plane parallel to the base plate by means of magnetic forces from at least one magnet means located beneath.

2 Claims, 4 Drawing Figures

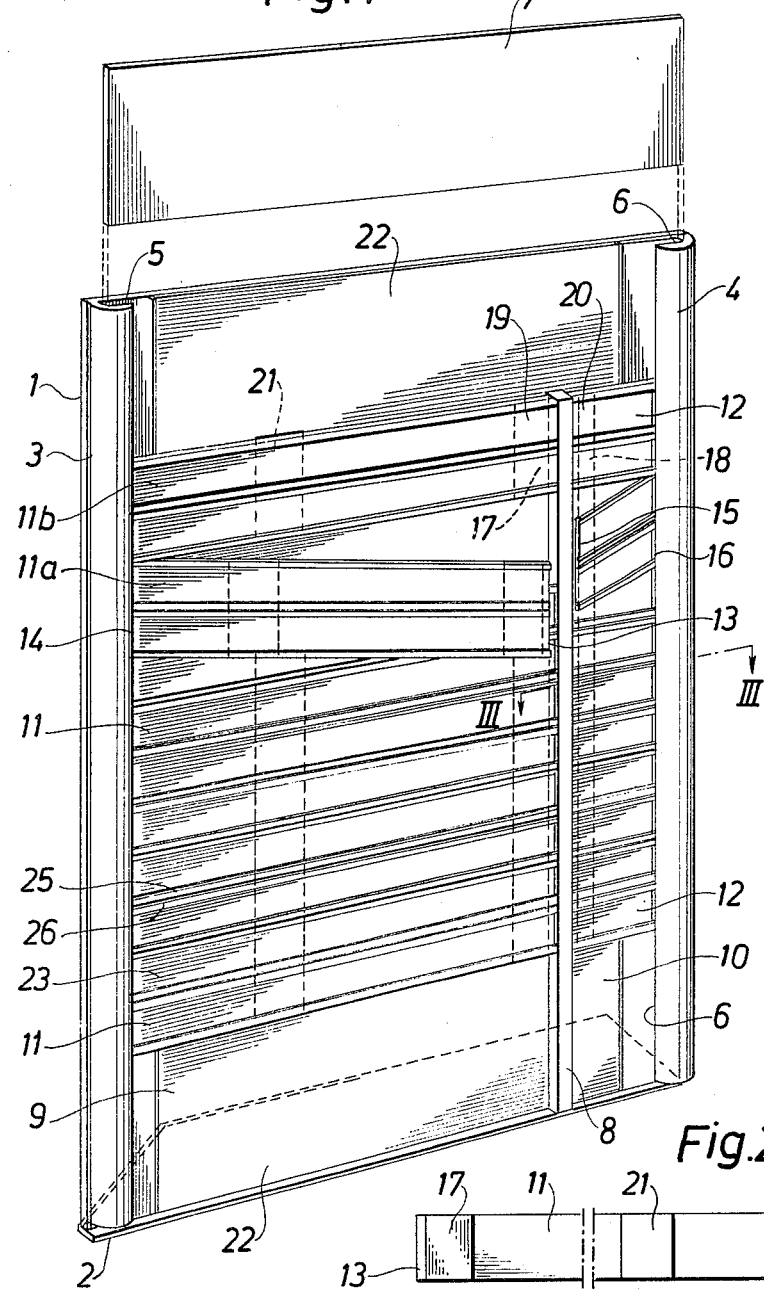
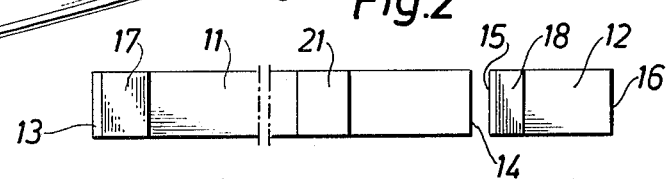
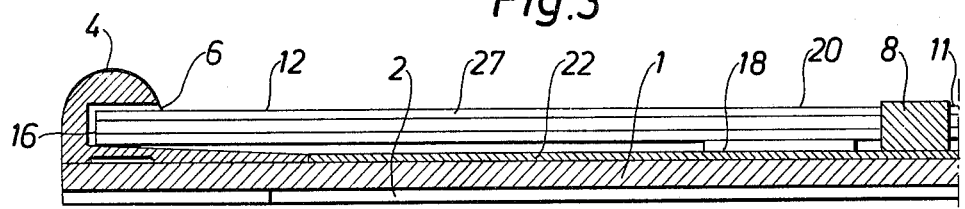

INFORMATION BOARD

This is a continuation of application Ser. No. 108,513 filed Dec. 31, 1979 now abandoned.

BACKGROUND OF THE INVENTION

The present invention relates to an information board of the type comprising a rectangular base plate having vertical first and second lateral supports and a number of flat, rectangular sign elements arranged in a plane parallel to the base plate, each of said sign elements being provided with at least one groove extending in the plane of the sign element to retain an exchangeable strip provided with characters, of the same length as the sign element and slightly narrower than the groove. Such a strip with characters is arranged to be inserted into the groove from any of the opposite ends of the sign element and is slideable in the groove.

Known information boards suffer from the disadvantage of being difficult to handle. Thus, for instance, the character strips of the sign elements, containing rows with text and other characters, cannot be quickly and reliably exchanged or re-arranged in a desired manner and at any point on the board, without sign elements above and/or below being dislodged from their desired positions.

It is a principal object of the present invention to obtain an improved information board that overcome the above problems.

SUMMARY OF THE INVENTION

This is achieved by the present invention in that the information or notice board in that the board also comprises a vertical partition slat arranged to divide the information board into a left panel for a predetermined number of said first sign elements of predetermined length and a right panel for a corresponding number of said second sign elements of predetermined length, said first sign elements being arranged to be received with one end in a groove facing the centre of the base plate and formed by said first vertical lateral support, the other end of said first sign elements being placed close to the partition slat, said second sign elements being arranged to be received with one end in a corresponding groove facing the centre of the base plate and formed by said second lateral support the other end of said second sign elements being placed close to the partition slat, and each of said first and second sign elements being arranged to be retained in a horizontal position in said plane parallel to the base plate by means of magnetic forces from at least one magnet means located beneath.

The sign elements used in the information board according to the invention have the same width so that the sign elements are arranged in pairs in two groups, the two sign elements in each pair, that is to say one sign element from each group, being arranged in line with each other in order to receive text and character strips aligned with each other which belong together, such as the courses in a menu and the price of each course.

The invention will be described in more details with reference to the drawings in which FIG. 1 shows an information board according to the invention in perspective, seen obliquely from above, FIG. 2 shows the back surface of two sign elements included in the information board, FIG. 3 is a section along the line III—III in FIG. 1 and FIG. 4 shows the profile of the sign element.

The information board shown in the drawings comprises a rectangular, flat base plate 1 of predetermined dimension, joined at the lower, horizontal side or made in one piece with a bottom support 2 and joined at the two vertical sides or made in one piece with lateral supports 3, 4. Each such side support forms or is provided with a vertical U-shaped groove 5, 6, said grooves facing each other and lying in the same plane. The lateral supports 3, 4 may with advantage consist of profile mouldings provided with a groove in accordance with the embodiment shown in the drawings, said profile mouldings being secured to the base plate with glue, for instance, or double-sided adhesive tape.

The information board also comprises a head sign element 7 of predetermined with and length which is intended to hold the principal information of the board, such as "Menu" if the board is to be used for listing various courses. The head sign element 7 is slightly shorter than the distance between the bottom surfaces of the grooves 5, 6 so that it can easily be inserted in the grooves in the lateral supports from above in order to be positioned on the board and retained in position by, inter alia, the lateral supports.

Furthermore, the information board comprises a vertical partition slat 8 which divides the board into two fields or panels of predetermined relative sizes comprising a left panel 9 and a right panel 10. The partition slat extends from the bottom support 2 up to said head sign element 7 and may with advantage provide a support for this in vertical direction.

The information board also comprises a number of first sign elements 11 of predetermined length for the left panel 9 and a corresponding number of second sign elements 12 of predetermined length for the right panel 10, the sign elements 11, 12 thus forming a first and second group of sign elements, respectively. Each of the first sign elements 11 is arranged in the board with its right end edge 13 located immediately next to the partition slat and its left end edge 14 located in the groove 5 of the side support 3. Similarly, each of the second sign elements 12 is arranged in the board with its left edge 15 located immediately next to the partition slat 8 and its right edge 16 located in the groove 6 of the lateral support 4.

The sign elements are arranged to be retained in position by means of magnetic forces from suitable magnets. In the information board according to the invention it is particularly advantageous to use magnetic strip which is glued to the back of the sign elements as shown in FIG. 2. Such magnetic strips 17, 18 are arranged at least in the vicinity of each edge 13 and 15 close to the partition slat since the sign elements are free at these end sections 19 and 20, i.e. not impeded by any lateral support. They can therefore be released from the underlaying surface by being pulled way with suitable force, using the fingers. These magnetic strips 17, 18 are thus designed to provide limited retention of the sign elements at their end sections, but the retention is overcome quite easily by a gentle pull outwards at the end of the desired sign element after gripping the protruding section 19 with the fingers. Since the sign elements are relatively long, such as the elements 11 intended for the left panel 9 according to the embodiment shown, it is desirable, and usually necessary, also to arrange a magnetic strip 21 on the bottom surface of each sign element 11, suitably at a position being at a distance from both the edge 13 of the sign element and its middle (the distances may be equal or unequal). In this way any sign element 11, for instance the sign element 11a, can be removed without the sign element(s), for instance the sign element 11b, falling down in an undesired manner at the end sections facing the lateral support 3. The sign element removed can then easily and quickly be inserted once again in its place on the board without being obstructed by the sign element 11b above, i.e. without this sign element 11b located above having to be lifted to its correct horizontal position. The sign elements can of course be provided with magnetic strip covering larger areas of the back than is shown, for instance the entire rear side, but such an arrangement is not economically justifiable and, particularly if the sign elements are long, the magnetic adhesion may be too strong to permit easy removal of the sign elements from the board.

The magnetic strips are arranged to cooperate with magnetiziable material underneath; unless the base plate 1 has such properties therefore, it is necessary to arrange one or more flat sheet elements of magnetizable material such as sheet iron, on the base plate 1. In the embodiment shown a single sheet element 22 is used which is arranged to cover substantially the entire base plate between the side supports and also lies within the field for the head sign element in order to provide a uniform construction. The magnetic strips need not therefore be placed so accurately on the sign elements. The sign element 22 is preferably glued to the base plate with double-sided adhesive tape, but other methods of securing is are of course also possible. In such an embodiment the partition slat 8 can be secured, with adhesive for instance, directly to the sheet element 22 as shown rather than on the base plate, thus eliminating the necessity of making a special groove in the sheet element for the partition slat. Alternatively, several sheet elements in the form of strips of magnetizable material may be arranged vertically on the base plate and aligned with the positioning of the magnetic strips on the back surface of the sign elements. In the embodiment shown, therefore, the single sheet element 22 may be replaced by three such strips. Similarly the head sign element may be provided with one or more magnetic strips if desired, to cooperate with one or more sheet elements of the type described, said magnetic strips then acting as retaining members so that the head sign element is held in the desired horizontal position, i.e. without slipping down at either end when one or more of the sign elements below is removed from the board. This can also be achieved by other retaining members such as members which wedge the head sign element into at least one of the grooves 5, 6.

The sign elements 11, 12 are of a special design and intended to be used in combination with detachable, easily exchangeable information strips 23. Each sign element is produced by profiling a flat blank so that similar parallel strip grooves 24 are formed on one side of the blank, these being dove-tailed in profile, and an intermediate section 25 with V-shaped, visible groove 26, and also oblique outer edge surfaces 27, wherein adjacent edge surfaces of two sign elements forming a V-shaped, visible groove similar or substantially similar to the V-shaped groove formed between two strip grooves. As can be seen in the drawings, the sign elements in each panel or group have a uniform appearance with no indication that the group is built up of a number of sign elements and with no particular division being visible between two adjacent sign elements. Besides the information board having an extremely esthetically attractive appearance, the advantage is also gained that it is difficult for unauthorized persons to dismantle. The design of the information board as a whole, including the arrangement of the sign elements in the grooved lateral supports and the arrangement of the magnetic strips also contribute to this.

Sign elements having a number of grooves (one or three, for instance) receiving information strips may also be used if desired. Normally all sign elements are the same width irrespective of the number of strip grooves. The information board is preferably made of aluminium as far as possible, i.e. including the base plate, lateral supports, bottom support, partition slat and sign elements.

The invention is not limited to the embodiment described above but can be varied in many different ways within the scope of the claims. The sign elements may be retained, for instance by means of magnetic forces from a surface either in the form of the base plate itself, which in that case is magnetic, or a magnetic sheet or foil arranged on the base plate or in the form of one or more magnetic strips. It will be understood that with such embodiments each sign element consists of a magnetizable material or each sign element, if it is not magnetizable, for instance consisting of aluminium, is provided on the back with one or more metal strips of magnetizable material to cooperate with said magnetic surface.

I claim:

1. An information board comprising a base member having an upper and lower end, first and second lateral support members including an extended portion spaced from and substantially parallel to said base member thereby providing first and second facing grooves defined by the spaces between said extended portions and said base member, partition means including first and second parallel spaced side edges arranged substantially parallel to said lateral support members and affixed to said base member so as to divide said base member into first and second panel portions, said first panel portion being defined by the area located between said first lateral support member and said first side edge of said partition means and said second panel portion being defined by the area between said second lateral support member and said second side edge of said partition means, said partition means including an upper end which is spaced from said upper end of said base member, a head sign element having first and second ends, said head sign element having a length substantially corresponding to the width of said base member such that said head sign element may be affixed to said base member with said first end of said head sign element being located within the first groove and said second end of said head sign element being located within said second groove, a plurality of first and second sign elements of relatively rigid construction releasably affixed respectively to said base member in said first and second panel portions, said first sign elements having a first predetermined length and first and second ends and said second sign elements having a second predetermined length and first and second ends, said first sign elements being longer than second sign elements, said sign elements adapted to be releasably affixed to said base member with said first ends of said first sign elements being located within said first groove, said second ends of said first sign elements being located substantially abutting said first side edge of said partition means, said first ends of said second sign elements being located in said second groove and said second ends of said second sign elements being located substantially abutting said second side edge of said partition means such that said sign elements may be removed from said base member substantially without bending by lifting said sign elements at said second ends in a direction substantially perpendicular to said base member without interference from said first and second edges of said partition means and adjacent sign elements while said first ends of said first and second sign elements are initially retained respectively within said first and second grooves, magnet means for releasably affixing said first and second sign elements to said base member, said magnet means including magnetic material integral with said base member and at least one strip of magnetic material affixed to the surfaces of said first and second sign elements which are releasably affixed to said base member adjacent to said second ends of said first and second sign elements, said first sign elements including at least a second strip of magnetic material affixed to their surfaces releasably affixed to said base member, said at least one second strip of magnetic material being spaced from said at least one strip of magnetic material, and retaining means provided on each of said first and second sign elements for exchangeably retaining a pair of parallel information carrying strips on the faces thereof having a length substantially corresponding respectively to said first and second predetermined lengths of said first and second sign elements, said retaining means including two pairs of facing grooves formed along the length of said first and second sign elements, said pairs of grooves formed by substantially linear arm members extending obliquely from the surfaces of said sign elements, one of each of said pair of arm members forming said pairs of grooves on said first and second sign elements being disposed adjacent to each other thereon such that said plurality of first and second sign elements have a uniform appearance without a particular division between adjacent sign elements being noticeable thereon.

2. The information board of claim 1 wherein said pairs of facing grooves on said first and second sign elements have a V-shaped configuration.

* * * * *